(12) United States Patent
Carlier et al.

(10) Patent No.: US 7,938,148 B2
(45) Date of Patent: May 10, 2011

(54) METHOD OF THERMALLY INSULATING COAXIAL PIPES WITH A PARTICULATE INSULATING MATERIAL

(75) Inventors: Boris Carlier, Le Vesinet (FR); Benoit Landreau, Chatenay Malabry (FR)

(73) Assignee: Saipem S.A., Montigny le Bretonneux (FR)

( * ) Notice: Subject to any disclaimer, the term of this patent is extended or adjusted under 35 U.S.C. 154(b) by 1005 days.

(21) Appl. No.: 11/792,347

(22) PCT Filed: Dec. 7, 2005

(86) PCT No.: PCT/FR2005/003062
§ 371 (c)(1),
(2), (4) Date: Jun. 5, 2007

(87) PCT Pub. No.: WO2006/061512
PCT Pub. Date: Jun. 15, 2006

(65) Prior Publication Data
US 2008/0121304 A1 May 29, 2008

(30) Foreign Application Priority Data
Dec. 8, 2004 (FR) .................................... 04 13050

(51) Int. Cl.
*B65B 31/04* (2006.01)
*F16L 9/14* (2006.01)
(52) U.S. Cl. ................. 141/65; 141/8; 141/67; 138/149
(58) Field of Classification Search .................. 141/4, 8, 141/65, 67; 156/276, 294; 138/112, 148, 138/149
See application file for complete search history.

(56) References Cited

U.S. PATENT DOCUMENTS

| 2,347,855 | A | * | 5/1944 | Varga | 264/262 |
| 3,559,660 | A | * | 2/1971 | Rollins | 138/149 |
| 4,348,243 | A | * | 9/1982 | Craubner | 156/71 |
| 4,554,041 | A | * | 11/1985 | Schreier et al. | 156/276 |
| 4,956,032 | A | * | 9/1990 | Hahn et al. | 156/94 |
| 5,427,154 | A | * | 6/1995 | Stephens | 138/98 |
| 6,058,979 | A | * | 5/2000 | Watkins | 138/149 |
| 6,167,912 | B1 | * | 1/2001 | Stephens | 138/98 |
| 2007/0074778 | A1 | * | 4/2007 | Berti et al. | 138/145 |

FOREIGN PATENT DOCUMENTS
WO     WO 99/05447     2/1999
* cited by examiner

*Primary Examiner* — Timothy L Maust
(74) *Attorney, Agent, or Firm* — Cohen Pontani Lieberman & Pavane LLP

(57) ABSTRACT

A method of thermally insulating the annular space in an element of an assembly of two coaxial pipes, the space being filled with a porous thermally insulating material, under low absolute gas pressure in which method the following steps are performed: a) the pipe element is inclined, preferably at an angle α of 5° to 30°, the annular space being closed at each end by respective closure pieces; and b) substantially all of the annular space is filled with the insulating material in the form of particles in bulk; and c) preferably said particles of insulating material are shaken, at least intermittently, as the annular space is filled in order to compact the insulating material, the annular space being maintained under high vacuum during filling.

29 Claims, 6 Drawing Sheets

METHOD OF THERMALLY INSULATING COAXIAL PIPES WITH A PARTICULATE INSULATING MATERIAL

PRIORITY CLAIM

This is a U.S. national stage of application No. PCT/FR2005/003062, filed on Dec. 7, 2005. Priority is claimed on the following application: Country: France, Application No.: 04/13050, Filed: Dec. 8, 2004 the content of which is incorporated here by reference.

FIELD OF THE INVENTION

The present invention relates to a method of thermally insulating a coaxial pipe assembly, in particular for undersea pipes for conveying hot or cold fluids, and preferably undersea pipes for use in great depths.

More particularly, the invention relates to a method of thermally insulating the annular space between two coaxial pipes comprising an inner pipe and an outer pipe.

The present invention relates in particular to insulating such undersea pipes installed in oil fields at very great depths, and also to bottom-to-surface connection pipes suspended between the bottom of the sea and a surface ship anchored over said oil field.

Such coaxial pipe assemblies are made by assembling together end-to-end unit lengths or "coaxial pipe elements" also referred to below as "coaxial pipe strings", of a length that generally lies in the range 10 meters (m) to 100 m, and more particularly each being about 12 m, 24 m, or 48 m long.

In most fields of industry, there is a need for high performance insulation systems for keeping the fluids conveyed in pipework at a constant temperature so that transfers between pieces of equipment can be achieved over long distances, e.g. reaching several hundreds of meters, or even several kilometers. Such distances are commonplace in sites such as oil refineries, liquefied natural gas installations (−165° C.), and undersea oil fields extending over several tens of kilometers. Such oil fields are being developed in ever increasing depths of water, which depths can exceed 3000 m.

Numerous systems have been developed for reaching a high level of thermal performance and specific versions have been developed for being well adapted to great depths, i.e. to be capable of withstanding pressure at the sea bottom. The pressure of water is substantially 0.1 megapascals (MPa), i.e. about 1 atmosphere for every 10 m of depth, so at a depth of 1000 m the pipe must be capable of withstanding a pressure of about 10 MPa, i.e. about 100 atmospheres, and at a depth of 3000 m, a pressure of about 30 MPa, i.e. about 300 atmospheres.

The most effective technologies that have been developed for reaching this object are so-called "Pipe-in-Pipe" (PiP) technologies, in which an inner pipe conveys the fluid and an outer pipe coaxial about the inner pipe comes into contact with the surrounding medium, i.e. water. The annular space between the two pipes can be filled with an insulating material, or it can be evacuated of all gas.

When using an insulating material of the polyurethane foam type in a gaseous atmosphere, the thicknesses of insulating material required are generally large, e.g. 5 centimeters (cm) or 10 cm, and that requires the use of an outer pipe of large diameter. Unfortunately, it is the outer pipe that must be capable of withstanding the pressure at the sea bottom without imploding, which implies a greater area of steel because of the large diameter and a greater thickness of steel to withstand the pressure. Furthermore, the annular space filled with foam creates additional buoyancy that often needs to be compensated by increasing the weight of the pipe, where said increase is often obtained by increasing the thickness of the outer pipe. Thus, the dimensioning of the outer pipe is often dictated by considerations of ensuring that the PiP assembly is not buoyant, rather than by the need to withstand pressure at the sea bottom.

In order to mitigate that drawback, much higher-performance technologies have been developed in which it is desired to minimize the annular space between the pipes, in particular by creating a vacuum in the interstitial zone. The vacuum created in that way then constitutes an excellent insulator, and an annular space of 10 millimeters (mm) to 20 mm suffices. The performance of the PiP is then comparable to that of a well-known glass "thermos flask". In order to improve insulation, radiation is also limited by coating the outer portion of the inner pipe with a reflective film, generally constituted by a film of aluminum and possibly associated with thermoplastics materials.

Pipes are then prefabricated to unit lengths of 12 m to 48 m, and then during laying, they are assembled to one another to form a continuous connection. In the event of damage to one or more lengths of PiP, thermal bridges are established, and provided they remain small and limited in number, they do not have significant repercussions on the behavior of the pipe, which can in general continue to perform its function over time.

After evacuation to a very low level of absolute pressure, the outside of the inner pipe, and also the inside wall of the outer pipe, continue to release molecules of gas. In particular, the inner pipe, which is generally made of carbon steel, can be the subject of corrosion phenomena, in particular due to the fluids it conveys, and that can have the consequence of producing atomic hydrogen $H^+$. This then tends to migrate in atomic form through the iron and carbon matrix of the steel to recombine on the outside wall of the inner pipe, and thus in the annular space between the two coaxial pipes so as to form hydrogen gas. The vacuum created in this annular space then degrades because of the increase in the pressure of hydrogen, which is an excellent conductor of heat, thus going against the intended object. In the same manner, the insulating material continues to degas over time, thus having the effect of increasing gas pressure and reducing the effectiveness of the insulation.

One known means for mitigating that drawback consists in introducing into the annular space a material known as a "getter", having the function of absorbing the gas that is given off, and thus of keeping the pressure as low as possible, thereby conserving a desirable level of vacuum throughout the working life of the oil field, which may exceed 20 years of even 30 years. Getter material can be obtained for example from the Italian supplier SAES, and it is introduced during manufacture of the evacuating PiP prior to final sealing thereof.

Another technique consists in implementing porous insulating material, and in particular microporous materials such as open-celled polyurethane foam or nanoporous materials, in particular of the aerogel type. Radiation crossing that kind of structure is trapped locally, since instead of passing directly through the medium, it follows a path of reflection from cell to cell, so the mean rate of transfer is divided by 10 or even more.

That type of insulation provides good performance since it serves to limit the transfer of heat by conduction, convection, and radiation, and it serves to create reflector screens having the function of reflecting high-energy radiation. The limit on conduction is obtained by the lack of molecules present or by molecules becoming trapped within an organized structure having cavities within the porous insulating material, which material is preferably nanoporous. Such porous and nanoporous insulating materials are well known to the person skilled in the art and are not described in greater detail below.

WO 01/38779 in the name of the Applicant discloses insulating tubular complexes in which the porous insulating material is confined in a flexible vacuum-air-tight envelope, said complex being tubular in shape and being inserted in the annular space. The insulating material is then in the form of a rigid solid material that is capable of maintaining its own shape.

The flexible envelope is constituted by a multilayer film including at least one screen layer acting as a molecule barrier, preferably a metal film, and at least one insulating layer, preferably of thermoplastic. That tubular configuration is advantageous since it does not present any discontinuity in the circular radial direction, the only discontinuity in the insulation being situated at each of the longitudinal ends of the complex.

In that patent WO 01/38779, there is described more particularly the way in which such cylindrical complexes can be prepared, and in particular the way in which the flexible envelope can be assembled and welded to the ends of the inside and outside walls by creating folds for accommodating the relative displacements of the inside wall and the outside wall of the envelope while it is being put into place around the inner pipe.

Although presenting very high performance, that type of tubular complex is complex and expensive to make and to put into place in the annular space between the coaxial pipes.

Also known is patent EP-0 890 056 that describes such a double-walled pipe that includes, in the annular space between the two said PiP pipes, a self-supporting plate of microporous material with open pores, presenting sufficient flexibility to enable it to be rolled against the inner tube. That self-supporting plate does not occupy all of the annular space, thereby leaving a free passage for gas to flow longitudinally, in which passage a low pressure is established all along said annular space. The unit length of pipe strings of that type is generally about 24 m or 48 m, so that a configuration that establishes a free passage for gas flow while performing evacuation enables pumping to be performed efficiently and quickly in order to achieve the desired high vacuum. However, the effectiveness of the insulation system is not optimized, since the annular space between the inner pipe and the outer pipe is filled only partially with the micro- or nanoporous material under a high vacuum.

BACKGROUND OF THE INVENTION

Thus, the problem posed is to provide PiP type coaxial pipes presenting thermal insulation in their annular space, which insulation is both effective in terms of the insulation it provides and is also simple to make and to put into place in the annular space between said pipe.

More particularly, the thermal insulation requirements of the present invention also include:
  very high-performance insulation corresponding to values for the heat transfer coefficient of the order of a few milliwatts;
  insulation that is compact so as to be capable of being received in small confined places (as required in the aerospace, aviation, and on-shore or off-shore oil industries);
  thermal insulation that is light in weight so as to avoid disturbing and/or increasing the weight of the primary structure that is to be insulated (the insulation must not give rise to forces and stresses that are off specification);
  thermal insulation that is easy to use and adaptable to all kinds of pipework; and
  thermal insulation covering a wide range of temperatures from very low temperatures (−170° C. or less) up to high temperatures of the order of 150° C. to 200° C., or more.

SUMMARY OF THE INVENTION

To do this, the present invention provides a method of thermally insulating the annular space in an element of an assembly of two coaxial pipes, in which spacing is preferably provided by centralizer elements, the insulation being provided by a porous, thermally-insulating material that is confined under small absolute gas pressure in said annular space, which method comprises:
  a) placing said pipe elements at an inclination, preferably at an angle α of 5° to 30°, said annular space being closed at each end by a closure piece, the closure piece at the top end including a filler orifice that is closable; and
  b) substantially completely filling the annular space with said insulating material in the form of particles in bulk, preferably in granule form, by pouring the material into said filler orifice of the closure piece at the higher end of said inclined pipe elements, said annular space being maintained under a high vacuum throughout filling.

Said particles of insulating material are preferably shaken at least intermittently while the annular space is being filled by causing said pipe element to vibrate, preferably vertically, and/or by pivoting it by rocking angularly back and forth about its longitudinal axis XX', in order to compact said insulating material.

The term "porous insulating material" is used herein to mean an insulating material presenting porosity greater than 80%, preferably greater than 90%.

The oblique position of the string allows the particles of insulating material to travel naturally along the annular space under the effect of gravity until they reach the rising front of insulating material. Below the rising front, the annular space is normally completely filled with insulating material, whereas above the rising front, the annular space is completely empty thus facilitating downward progress of particles under the effect of gravity.

When the insulating material presents mediocre compactness, i.e. when the particles are disjoint and even present gaps, however small, it can happen during transport of the installation on site, or even at any moment in the lifetime of the pipe, e.g. in the event of hammering or back-and-forth bending of the pipe, that the particles move relative to one another, thereby compacting the insulating material. During such compacting, the particles become organized relative to one another, with particles of small diameter filling the gaps between larger particles, and as a result the overall size of the insulating material diminishes, which can thus lead to voids that propagate upwards under the effect of gravity acting on each of the particles, i.e. that propagate towards the top of the pipe, thereby potentially creating a cold point by a localized shortage of insulating material. For a pipe that is being laid by a J-lay tower, the pipe is in a practically vertical position on leaving the ship, and nearly all of said voids then collect close to the top ends of the strings, thus creating zones that can be quite large with strings that are 24 m or 48 m long, in which zones thermal performance is locally mediocre or even unacceptable. That is why it is advantageous throughout the duration of the filling operation to shake the mass of insulating material, and preferably in a zone that is close to the rising front, so that the particles take up positions relative to one another in optimum manner, thus avoiding forming undesirable voids between said particles, particularly in the vicinity of centralizer elements disposed at the surface of the inner pipe and ensuring that the inner and outer pipes are properly spaced apart, which centralizer elements constitute serious obstacles to the travel of particles and to particles being compacted. For this purpose, the entire length of the string is caused to rock back and forth, thus greatly facilitating the search for optimum compactness. Similarly, causing the string to vibrate in the vicinity of the rising front advantageously improves the compacting process. Movements in rocking and in vibration are either performed simultaneously or else sequentially.

Although the insulating material, when confined in the annular space, can be maintained substantially at atmospheric pressure while still presenting an acceptable level of insulation, it is generally more advantageous to maintain it at a low absolute gas pressure. To create this low absolute pressure, it is possible to evacuate the annular space after it has been completely filled with particles of insulating material, however such evacuation from one or two end orifices requires a considerable length of time, or may even be practically impossible because of the unit length of strings which can reach or exceed 24 m or 48 m. Thus, in the present invention, evacuation is performed while said annular space is being filled with said particles of insulating material and is preferably performed even before starting the process of transferring particles of insulating material, with all of the transfer elements being advantageously connected together in leaktight manner from the reservoir of particles through the various intermediate chambers and connection hoses to the annular space, and with the entire assembly being advantageously evacuated to an absolute pressure value well below the desired final level of vacuum. This absolute pressure level is referred to in the description below as a "high vacuum". Thereafter, filling is performed under said "high vacuum". At the end of filling, the annular space is full of compacted particles of insulating material at an absolute pressure that corresponds substantially to said "high vacuum", i.e. at an absolute pressure that is lower than the desired pressure. Thus, for example, if it is desired to have a final vacuum of 1 millibar (mbar), i.e. 100 pascals (Pa), then evacuation can be performed so as to reach a "high vacuum", e.g. in the range 0.2 mbar to 0.5 mbar, i.e. 20 Pa to 50 Pa.

The particulate insulating material may be in the form of particles having a variety of forms, including power form or pieces of fiber, or it is preferably in the form of granules, thus making it easier for the particles to roll naturally under the effect of gravity inside the inclined pipe element.

According to another characteristic of the method of the invention, which characteristic is preferred: in step b) said insulating material is poured from a first reservoir in which a high vacuum is established by evacuating through an orifice of said reservoir that is provided with a first leaktight isolation valve, and said particles of insulating material are conveyed via a first flexible hose between said first reservoir and said filler orifice of a closure piece for closing the annular space at the top end of the inclined pipe elements, and before said annular space is filled, and preferably also while said annular space is being filled, said annular space is itself evacuated via an orifice provided with a second leaktight isolation valve communicating with said first flexible hose.

According to other characteristics of the present invention that are advantageous:
said first flexible hose is connected to a filler chamber, the filler chamber being secured to said closure piece at said filler orifice, said filler chamber preferably presenting an upwardly-flared funnel shape at its base, with the filler chamber being evacuated, said filler chamber further containing a handling device for handling a stopper enabling said filler orifice to be closed after filling;
said first reservoir communicates at its base with a separator chamber preferably fitted in its top portion with a deflector in the form of a downwardly-flared upside-down funnel, for separating the particles of said insulating material from one another, said particles traveling merely under gravity towards a bottom orifice in the form of an upwardly-flared funnel in communication with said flexible hose, said separator chamber including an orifice provided with a second leaktight valve serving to evacuate said separator chamber, said first flexible hose, where appropriate said filler chamber, and also said annular space of said pipe element, which are connected thereto.

Still more particularly, the following successive steps are performed:

1) evacuating to a high vacuum, preferably less than 10,000 Pa, more preferably less than 100 Pa:
   both said first reservoir via said orifice provided with a first leaktight isolation valve; and
   the inside volumes of said separator chamber, of said first flexible hose, of said filler chamber, and of said annular space through said orifice of said first reservoir; then
2) opening a bottom orifice provided with a third isolation valve interposed between said first reservoir and said separator chamber in such a manner as to put the inside of said first reservoir into communication with said separator chamber when they are at substantially the same high level of vacuum; and then
3) closing said filler orifice from the inside of said filler chamber once said annular space is full of insulating material.

Advantageously, during filling, particles of getter material are mixed in with the particles of said insulating material via a second reservoir filled with particles of getter material and fitted with an orifice having a fourth leaktight isolation valve for evacuation purposes, said second reservoir co-operating via a fifth leaktight isolation valve in its bottom portion with a second flexible hose providing a connection with said filler chamber, said second reservoir being maintained at the same high level of vacuum throughout the filling operation, filling taking place merely under gravity by opening said fifth leaktight isolation valve.

Preferably, said getter material is mixed continuously or discontinuously merely by opening said fifth leaktight isolating valve, thereby spreading getter material all along the length of said annular space of said pipe element.

More preferably, said first flexible hose includes an internal spiral spring suitable for being set into rotation in order to improve the drive of particles and prevent plugs of insulating material forming inside said hose, i.e. while said granules of insulating material are moving.

Advantageously, the particles of insulating material present varying dimensions lying in a range 10 micrometers ($\mu m$) to 5 mm, so that the particles of the smallest dimensions can occupy interstitial spaces between particles of larger dimensions, thus making it possible to improve the compactness of the insulating material, i.e. the ratio of the real volume of the insulating material in a container of given volume.

Also advantageously, the particles of insulating material are spherical or substantially spherical grains, preferably having a diameter of 0.5 mm to 5 mm.

This configuration makes it easier for them to roll in the inclined annular space.

Advantageously, said insulating material is a nanoporous material obtained from the following materials known to the person skilled in the art:

- inorganic materials in the form of powders, granules, or woven or non-woven fibers, and in particular based on minerals selected from silica, alumina, perlite, or respectively based on glass fibers or on ceramic fibers; and
- open-celled organic materials, preferably polyurethane foam; and
- combined organic and inorganic materials such as polyurethane foam reinforced by fibers, or composite materials.

In a preferred implementation, the insulating material inside a said envelope is a nanoporous material, in particular an aerogel, preferably an aerogel of silica or titanium oxide. In another implementation, the nanoporous insulating material is a foam of nanoporous synthetic material presented in granule form.

An aerogel presents porosity with pores of nanometer dimensions that can give it an excellent level of insulation under normal atmospheric pressure and an extreme level of insulation under a low pressure of gas, and in particular under a high vacuum. Insulating systems based on an aerogel present very low density, thus correspondingly reducing direct thermal conductivity. Thus, an aerogel can present density relative to water of less than 0.1, with porosity thus being greater than 90%, and more particularly it can present relative density in the range 0.08 to 0.1.

It is desired to obtain extremely high levels of insulation, i.e. values for the overall heat transfer coefficient relative to the inside diameter of the inner pipe of:

$$U \leq 0.5 \text{ W/m}^2\text{K}$$

and in order to improve the performance of such base materials, it is important to empty the annular space of the gas it contains, generally air, in order to minimize heat exchange by contact. The level of vacuum required depends on the insulating material in question. Thus, with glass fiber, the vacuum must be very high, and thus the absolute pressure must be of the order of 10 Pa. With a polyurethane foam, the absolute pressure must be less than 500 Pa, and preferably lie in the range 100 Pa to 500 Pa. With compacted silica, the absolute pressure must be less than 5000 Pa, and preferably lie in the range 2500 Pa to 5000 Pa. With aerogels, the absolute pressure must be less than 10,000 Pa, which represents a vacuum that is not very high. Thus, it can be seen that for materials that are not sophisticated, such as glass fibers, the level of vacuum required is extremely high, whereas for aerogels, the level of vacuum is much less constricting. The type of insulating material selected is thus determined on technical and economic criteria, and it can vary depending on the diameters of the pipe and on the required material thickness, thereby having a considerable influence on the volume and thus the cost of the pipework, with the evacuation process remaining substantially the same. With a high vacuum, it is advantageous to incorporate a getter material within the insulating material in order for said getter material to absorb molecules trapped at the surfaces of said insulating and pipe materials, thereby maintaining the looked-for level of vacuum. In addition, the presence of a getter material has the advantage of continuing to perform evacuation by absorbing or adsorbing residual gas molecules, after the annular space has been finally air-tight off, and this phenomenon can continue over several weeks or even several months, depending on the internal porosity, commonly making it possible to improve the vacuum level by 10% to 30%.

Although aerogels present a level of performance that is advantageous at absolute pressures of about 10,000 Pa, i.e. at absolute pressures of about one-tenth of atmospheric pressure, it is advantageous to envisage pressure levels that are much lower than that so as to be operating on a substantially horizontal portion of the curve plotting thermal conductivity as a function of absolute pressure.

For installations for use at great depths, undersea pipes and assemblies of coaxial pipes for undersea use are assembled on land into elements of unit length lying in the range 10 m to 100 m depending on the loading capacity of the laying system. Thereafter, they are taken to sea on a laying vessel. During laying, the unit length of the various elements of coaxial pipe assembly are connected to one another on board the ship while they are being laid at sea. It is thus important for such interconnections to be integrated in the method of making and assembling the pipe and of laying it on the sea bed, while slowing things down as little as possible, thus requiring connections to be performed quickly and easily.

For this purpose, use is made of junction pieces or connection pieces constituted by steel forgings that are assembled to the ends of said coaxial pipe assembly elements that are to be assembled together. The junction piece at the downstream end of a first yet-to-be assembled coaxial pipe assembly element, being connected to the junction piece at the free upstream end of a second already-assembled downstream coaxial pipe assembly element.

In an advantageous embodiment, in the method of the invention, said pipe element is for use in assembling undersea steel pipes and presents a length lying in the range 10 m to 100 m, preferably about 50 m, and each of said closure pieces is constituted by a circularly symmetrical junction forging for joining two of said coaxial pipe elements together end-to-end, and serving to close said annular space at each end of said pipe element, said junction piece situated at the top end of said inclined pipe elements presenting a closable orifice in its outside wall, enabling said annular space to be filled with said insulating material.

More particularly, the said junction forging comprises two circularly symmetrical branches comprising an outer branch and an inner branch forming a fork defining said annular space, which fork has its free cylindrical ends assembled to the cylindrical ends respectively of the outer and inner pipes.

In an advantageous variant implementation of the method of the invention, said pipe element is held in an inclined position by at least one support tower on which it rests, and it is preferably supported by at least three support towers, one support tower being disposed respectively at each of its ends and the other towers being distributed, preferably in substantially regular manner, between said two end support towers.

According to an advantageous characteristic, in order to shape the particles during filling, pivoting is performed in back-and-forth angular rocking through an amplitude $2\beta$, preferably lying in the range $10°$ to $90°$, corresponding to turning through an angle of $\pm\beta$ of $5°$ to $45°$ relative to the vertical axial plane of the pipe element.

More particularly, said back-and-forth angular rocking is implemented by means of motor-driven wheels disposed transversely to the longitudinal direction XX' of said pipe element and bearing against the outside wall of said pipe element, on either side thereof, and on which said pipe element rests, said wheels being disposed at the top(s) of said support tower(s).

Said wheels thus have an axis of rotation parallel to the longitudinal axis XX' of said coaxial pipe element. An axial stop device situated on the axis of the pipe, preferably at the bottom, holds the string and prevents it from sliding downwards.

In a preferred implementation, in order to shape the particles during filling, said vibration is implemented as vertical up-and-down movements over an amplitude of 1 cm to 50 cm in height, said movements being imparted to said pipe element by means of one or more jacks or of mechanical actuators, such as a link connected to a crank shaft driven by a motor, disposed at the top(s) of said support tower(s).

In a particular implementation using three support towers, the following steps are performed:
  at the beginning of filling, said pipe element is made to vibrate at its point bearing on the lowest support tower, and it is held firmly stationary at its bearing points on the tops of the other support towers; and
  when said filling has reached about one-third of the length of said pipe element, said pipe element is caused to vibrate at the top of a support tower situated substantially in the middle of its length, and said pipe element is maintained stationary on the support towers at each end; and then
  when filling has reached about two-thirds of the length of the pipe element, said pipe element is caused to vibrate at its bearing point on the support tower towards the top end of the inclined pipe element, and said pipe element is held firmly to the other two support towers.

Also advantageously, in order to implement said vibration and said rocking using the same device, said actuator actuates a platform supporting said wheels on which said pipe element bears, and the vibration and the back-and-forth angular rocking are performed either simultaneously or sequentially.

The inclined pipe element may be supported on a continuous or discontinuous ramp that has special locations including the mechanical actuators or jacks needed for setting the string into vibration locally at its own resonant frequency.

The present invention also provides an installation that is useful for implementing a method of the invention, the installation comprising:
  means for inclining a said pipe element, preferably comprising support towers as defined above; and
  means for compacting by vibration and/or rocking during filling, preferably vibrator means using jacks as defined above and rotary drive means using wheels as defined above; and
  filler means comprising:
    a said first reservoir and a said first flexible hose as defined above; and
    vacuum pumps co-operating with said orifices that are provided with leaktight isolation valves; and
    preferably a said filler chamber, and a said separator chamber as defined above; and
    preferably a said second reservoir and a said second flexible hose as defined above.

The present invention also provides a coaxial pipe element that is thermally insulated with a particulate porous insulating material that is filled into the inside of the annular space under a vacuum, preferably at a pressure of less than 10,000 Pa, more preferably of less than 100 Pa, as can be obtained by a method of the invention.

For particles that are accurately spherical and of constant diameter, the theoretical filling coefficient varies depending on the way in which the spheres stack, between a minimum value of 0.52376 ($\pi/6$) to a maximum value of 0.7405 ($\pi/3\sqrt{2}$). The mere fact of shaking all of the particles while filling is taking place serves to approach said maximum filling coefficient. Said filling coefficient is advantageously improved by using an insulating material made up of granules having staged diameters, in particular in the range 10 μm to 5 mm so that the small granules are received in the gaps between granules of larger diameter, then making it possible to achieve filling coefficients in the annular that are greater than 0.85, and in particular that lie in the range 0.85 to 0.95.

Preferably, said coaxial pipe element has a circularly symmetrical junction piece at each of its ends for joining two pipe elements fitted in this way together end-to-end.

Finally, the present invention provides a pipe comprising pipe elements of the invention assembled together end-to-end.

More particularly, the pipe is an undersea pipe made of steel.

Still more particularly, the pipe is a bottom-to-surface connection pipe suitable for providing a connection to great depths, preferably greater than 1000 m.

BRIEF DESCRIPTION OF THE DRAWINGS

Other characteristics and advantages of the present invention appear in the light of the following detailed description with reference to the following figures, in which.

DETAILED DESCRIPTION OF THE PRESENTLY PREFERRED EMBODIMENTS

Figure 1:
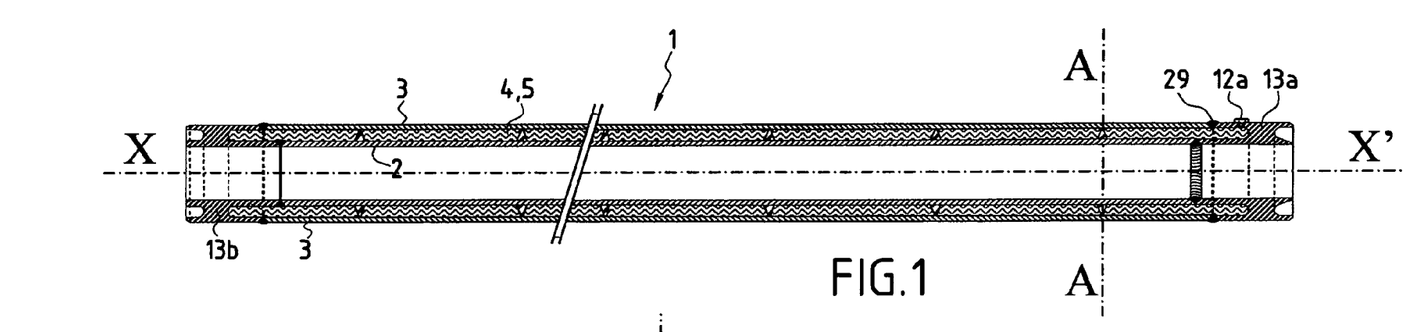
FIG. 1 is a longitudinal section in side view of a PiP type string filled with an insulating material under low gas pressure and fitted at its ends with junction forgings.
Figure 1A:
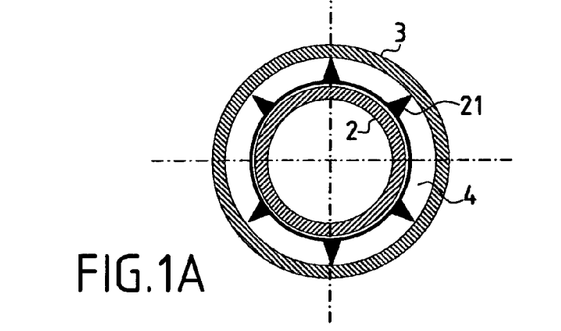
FIG. 1A is a cross-section of the FIG. 1 string on plane AA through a centralizer element.
Figure 1B:
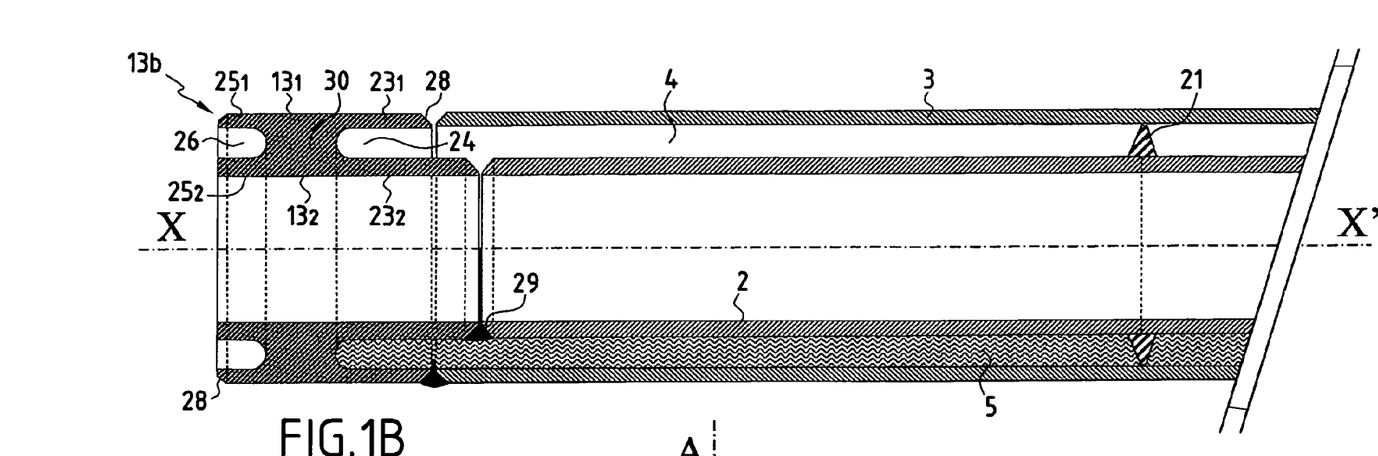
FIGS. 1B and 1C are sections in side view showing respectively the left and the right ends of the FIG. 1 string.
Figure 1C:
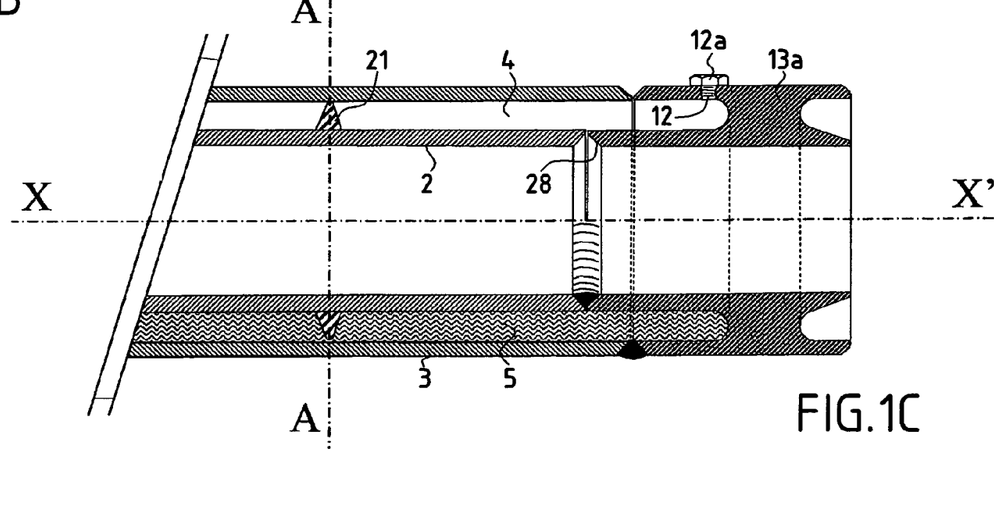

In FIGS. 1, 1B, and 1C, there can be seen a PiP type pipe 1 constituted by an outer pipe 3 and an inner pipe 2 secured by welding to a first junction forging 13b situated to the left in FIG. 1B and to a second junction forging 13a situated to the right in FIG. 1C, the annular space between said inner and outer pipes being filled with a micro- or nanoporous insulating material 4, with centralizer elements 21 around the circumference of the inner pipe and spaced apart, preferably in regular manner, along the length thereof. These centralizers maintain the radial distance between the inner and outer pipes and thus they maintain the thickness of said annular space at a value that is substantially constant.

Said junction forgings 13a and 13b are defined as follows:

in a radial direction relative to a longitudinal axis XX' of symmetry of said forging, said forgings are defined by a cylindrical inside wall $13_2$ having substantially the same diameter as the main portion of said inner pipe 2, and by a cylindrical outside wall $13_1$ of diameter substantially equal to the outside diameter of the main portion of said outer pipe 3; and in the longitudinal axial direction XX':

at the end of said junction forging for being assembled by welding 39 to the ends of said outer and inner pipes of a said element of an assembly of at least two coaxial pipes, said outside and inside walls $13_1$ and $13_2$ of said junction forging form in longitudinal section respective outer and inner first branches $23_1$ and $23_2$ of substantially the same thickness as said outer and inner pipes 3 and 2 to which they are to be assembled; said outer and inner first branches $23_1$ and $23_2$ defining a first annular cavity 24;

at the opposite end of said junction forging for assembly with another said junction forging, itself assembled by welding 29 to the end of another element of an assembly of two coaxial pipes, said outside and inside walls $13_1$ and $13_2$ form in longitudinal section respective outer and inner second branches $25_1$ and $25_2$, defining a second annular cavity 26; and the bottoms of said first and second cavities 24, 26 being spaced apart in said longitudinal direction XX' so as to define a solid zone 30 of said junction forging in which said outside and inside walls $13_1$ and $13_2$ constitute the outer and inner faces of a single cylindrical wall.

As shown in FIG. 1B, the first annular cavity 24 is open to the annular space 4 and can receive the insulating material 5 so as to continue insulating the pipe as far as possible.

After two unit lengths of PiP fitted with junction forgings of the invention have been assembled and connected together, the second annular cavity 26 of a first junction forging at the downstream end of the first length of PiP is open over a second annular cavity of a second junction forging 1a at the upstream end of a second length of PiP, thereby forming a chamber that is made by welding together the ends of the outer second branches $25_1$. However the chamber is not air-tight since the ends of the inner second branches $25_1$ of the two junction forgings 13 are not welded together, the faces of said branches merely being in contact with each other.

According to the invention, the free ends of said outer and inner first branches $23_1$ and $23_2$ present a chamfer state 28 that enables a first "full penetration" welding pass to be performed in known manner, followed by complete filling of the chamfer as shown at 29. In FIG. 1B, the chamfers 28 face outwards and are thus suitable for being welded from the outside of said outer and inner pipes $23_1$ and $23_2$. In FIG. 1B, the chamfers 28 face outwards at the end of said outer first branch and inwards at the end of said inner first branch, thus making them suitable for being welded respectively from outside said assembly for said outer first branches and from the inside of said inner pipe for said inner first branches.

The forming of said first and second annular cavities makes it possible firstly to establish continuity in terms of inside diameter for the inner pipe, and secondly to provide relative continuity and unchanging second moment of area of the cross-section between the main zone of the PiP and the connection zone, the thickness of the outer branch of the junction forging being substantially equal to or slightly greater than the main thickness of the outer pipe.

The distance of the ends of said outer and inner first branches from the bottom of the first cavity, and the distance between the end of said outer second branch and the bottom of said second cavity enable welding to be carried out under good conditions, since the mass of steel on either side of the welding zone is substantially equal and the melting zone is not disturbed by a "radiator" effect caused by the solid and massive zone situated between the bottoms of said first and second cavities, where such a disturbance would lead to unbalanced cooling between the left and right sides of said welding zone.

Finally, the continuity of the diameter of the outside wall in said junction forging compared with the diameter of the main portions of the outer pipes serves to create a significant increase in the second moment of area of the cross-section in the connection zone between two adjacent junction forgings, thereby reinforcing the connections specifically where stresses are at their greatest. The second moment of area of the cross-section of a pipe about its center varies with the fourth power of its radius, which means that a considerable thickness is necessary in the prior art as described in GB-2 161 565 and GB-2 191 942. In contrast, if the cross-section under consideration corresponds to that of the outer pipe of the PiP, the necessary thickness is greatly reduced, and sometimes even halved, considerably simplifying the welding assembly operations performed on board installation ships under conditions that are difficult.

Furthermore, the fact that two adjacent junction parts are welded together solely at the ends of said outer second branches, enables all of the stress and load transfer phenomena to be localized in the outer regions without involving said inside walls, thus making it possible to obtain better control over the risks of cracking or over fatigue phenomena and to avoid the device from collapsing completely at its inside wall.

In addition, the fact that the two ends of said two inner second branches of two adjacent forgings of the invention are not welded together allows said inside walls to make tiny movements where they face each other due to any bending or variations of pressure or temperature, and allows said inside walls to deform plastically, enabling said inner second branches to be upset without any risk of transferring compression loads in contact, thus serving to avoid interfering with the distribution of stresses in the assembly zone and ensuring that the major portion of the stresses are distributed in the outsides of said forgings.

The formation of said cylindrical inside wall providing almost complete continuity with the inner pipe serves to avoid vortex type turbulence phenomena in the flow of fluid within the device after it has been assembled, where two of said junction forgings of two adjacent PiP portions are connected together.

All of these characteristics contribute to greatly improving bending behavior and also the fatigue behavior of a device involving two coaxial assembly elements fitted with said junction forgings connected to each other on board installation ships.

Furthermore, said junction forgings are relatively easy and reliable to fabricate and assemble, both in terms of connecting two adjacent junction forgings together, and in terms of connecting a junction forging to the end of a set of at least two coaxial pipes.

It should be observed that after two junction forgings have been connected together, said second cavity must not be air-tight from the inside of said inside wall and from said inner pipe since on starting fluid flow therein, the fluid must migrate into the second cavity, with sealing being provided by the outer weld between the ends of said outer second branches, with the fluid then being trapped throughout the working lifetime of the installation in said second cavity.

Figure 2:
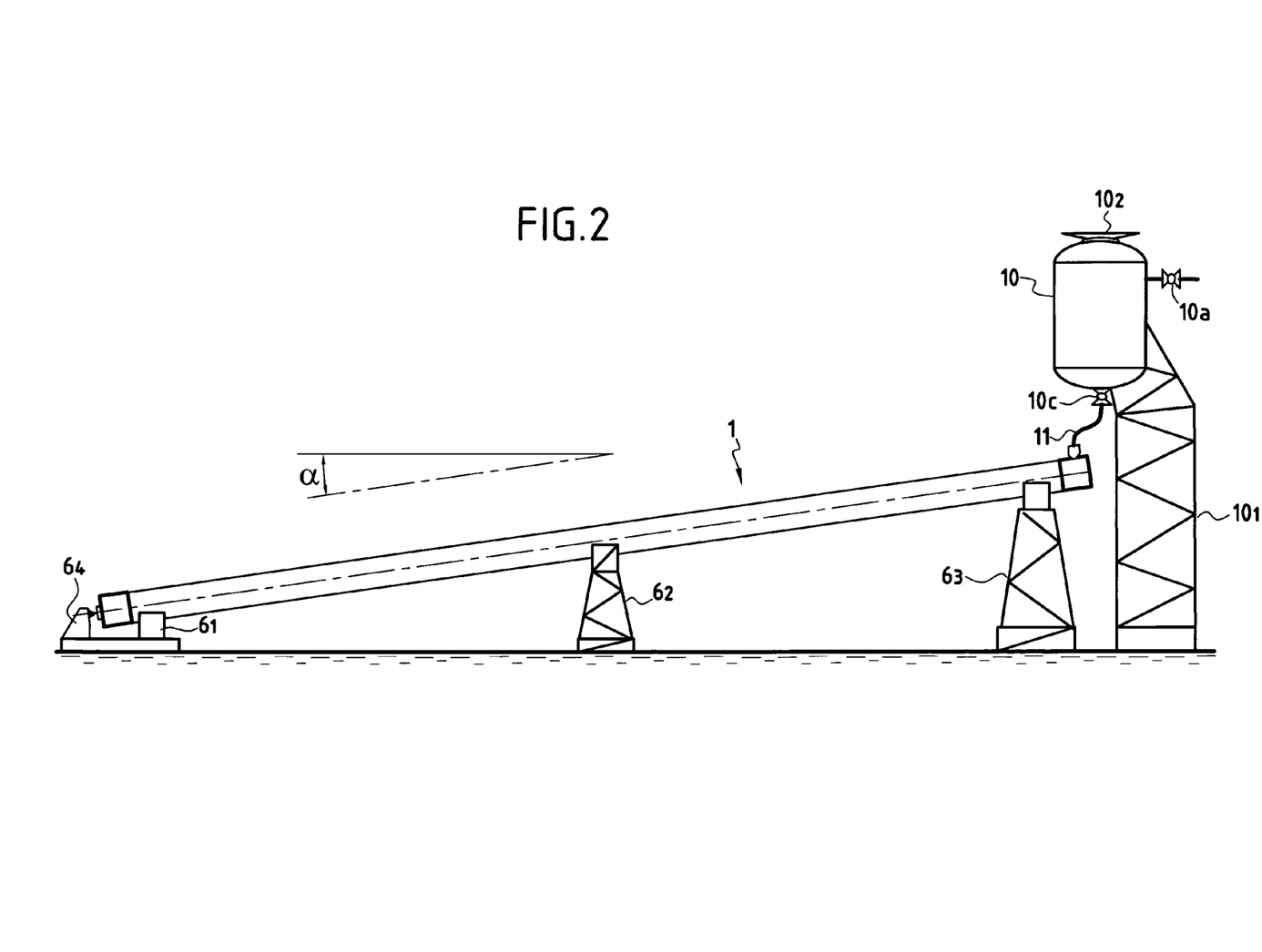
FIG. 2 shows how the string is filled while it is in a position that is inclined at an angle α relative to the horizontal, the string being filled with a granular insulating material under gravity from a receptacle situated above said string.

To clarify the description, in FIGS. 1A, 1B, and 2, the various component elements are shown as being welded together in the bottom halves of the figures, and as being positioned facing each other prior to performing said welding 29 in the top halves, and likewise the annular space is shown as being filled with insulating material 5 in the bottom halves of the figures, and as being empty of any insulating material in the top halves where the parts are positions face to face prior to welding.

A sealing closure plug 12a closes the filler orifice 12 provided in the outer branch $23_1$ of the junction part 13a.

FIG. 2 shows the device for filling a PiP string made up of three support towers $6_1$, $6_2$, $6_3$ of increasing height situated close to its ends and substantially in the middle of its length, holding said string at a substantially constant inclination of an angle α. An axial abutment device $6_4$ situated on the axis of the pipe, preferably at its bottom end, holds the string and prevents it sliding downwards. At its top end, a first flexible hose 11 connects the filler orifice 12 of the junction forging 13a to a first reservoir 10 for storing particles of porous insulating material. Said first storage reservoir is installed above the top end of the inclined pipe element 1 on a support tower $10_1$ so that particles of insulating material can be transferred merely by gravity.

Figures 3, 3A, 3B:
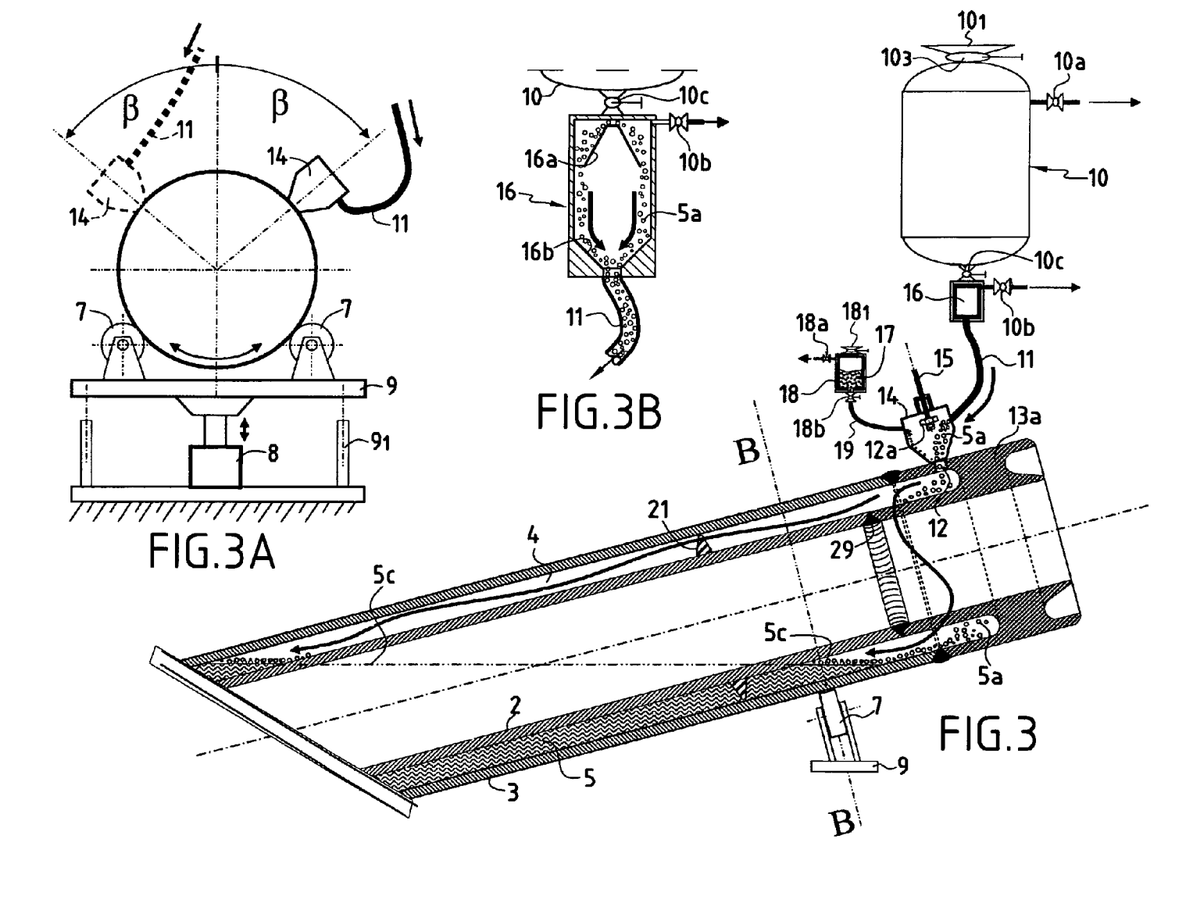
FIG. 3 is a side view in section showing granules being filled into the top portion of the string.
FIG. 3A is a section on plane BB of FIG. 3 showing in detail how the string is rocked back and forth, and showing the device for exciting vibration of said string.
FIG. 3B is a side view in section showing a chamber for separating and degassing granules prior to filling the string.

FIG. 3 shows the detail of the devices enabling particles of insulating material to be transferred from the first reservoir 10 towards the annular space 4 of the PiP, through the filler orifice 12. The granules 5a penetrate into the annular space 4 and merely under gravity find their way to the bottom portion building up a rising front 5c of insulating material.

The first reservoir 10 is surmounted by a loading hopper $10_2$ and it is fitted with a first air-tight isolating valve $10_3$. Said first reservoir 10 is also fitted with a first air-tight isolating valve 10a, enabling said reservoir to be evacuated, and a bottom orifice provided with an air-tight bottom valve 10c situated below said reservoir 10. The bottom valve 10c leads to a chamber 16 for separating granules of porous insulating material, as shown in detail in FIG. 3B. The separation chamber 16 is fitted at its top end with a deflector in the form of an upside-down funnel 16a, i.e. a deflector that flares downwards, such that the granules fall on the outside face of the deflector and are spread about and separated from one another, said granules moving merely under gravity towards the bottom orifice likewise in the form of a funnel 16b, but upwardly flared, leading to the connection hose 11. An orifice provided with a second air-tight isolation valve 10b, preferably situated at the top of the separation chamber 16 enables said chamber to be evacuated throughout the filling process, thus improving the degassing of the particles of porous insulating material 5a as they pass through said separation chamber 16 specifically because the particles are separated.

The first flexible hose 11 is connected to a filler chamber 14 connected in air-tight manner to the junction forging 13 at the orifice 12, so that the granules 5a delivered by the first flexible hose 11 penetrate through the orifice 12 into the annular space 4 of said PiP string 1. For this purpose, the bottom portion of said filler chamber 14 is advantageously shaped to form a funnel so as to make it easier for the granules 5a to pass through, merely under gravity. The top portion of said filler chamber 14 advantageously has installed therein a device for manipulating the stopper 12a, in the form of a rod 15 secured to said stopper. The axis of said rod 15 and of said stopper 12a coincide with the axis of the orifice 12, such that when the annular space has been filled, it is possible to close said orifice 12 merely by screwing in the stopper 12a, with said screwing being performed from the outside by means of the rod 15 without it being necessary to disconnect the filler chamber 14. Since the passage of the rod 15 into the chamber 14 is airtight, it is thus possible to perform all of the filling of the annular space 4 with granules 5a and also to close the filler orifice 12 by means of the stopper 12a while under an extremely high vacuum, in particular of 100 Pa, and without any undesired gas being introduced.

The string presents a length of about 12 m, 24 m, or 48 m, so that once said insulating material has been put into place it is practically impossible to evacuate the space in order to achieve a very high vacuum, which is why, according to the invention, the following steps are performed installing the string on the support $6_1$, $6_3$ so as to present an inclination a relative to the horizontal; then installing the first reservoir 10 filled with granules 5a of insulating material 5 above its top end, said first reservoir being previously evacuated through the orifice provided with the first air-tight isolation valve 10a; then connecting said first reservoir 10 to the granule separation chamber 16 which is connected via the flexible hose 11 to the filler chamber 14 itself secured in leaktight manner to the junction forging 13 via the filler orifice 12; then evacuating the volume constituted by said chamber 16, said connection hose 11, said filler chamber 14, and said annular space 4 of said PiP string 1 through the orifice in the separation chamber 16 that is fitted with the second valve 10b; then once the desired level of vacuum has been reached, opening said third valve 10c so as to put the inside of the reservoir 10 into communication with the chamber 16, these two volumes then being at substantially the same high vacuum; granules are then transferred merely under gravity until the entire volume of the annular space is filled with the insulating material 5; then closing the third or bottom valve 10c of said first reservoir 10; and actuating the rod 15 in translation parallel with its axis and simultaneously turning it so as to bring the threaded stopper 12a into engagement with the corresponding thread of the filler orifice 12, and then tightening the stopper in leaktight manner; and then breaking the vacuum in the separation chamber 16 and the filler chamber 14 by opening said valve 10b of the separation chamber 16. The separation chamber 16 can then be released from the string 1. The string is then terminated and can be transferred to the storage area for finished products.

In order to improve filling and facilitate downward movement under gravity of the granules 5a within the annular space 4, it is advantageous to rock the string 1 as explained in FIG. 3A. For this purpose, said string is supported at the top of the structures $6_1$, $6_3$ by rollers 7 so as to be capable of being turned back and forth through an angle ±β in 2 seconds (s) to 10 s, for example, by means of a motor that is not shown. This enables the rising front 5c of granules to be rocked continuously so as to compact the materials properly, and also serves to avoid obstructions forming at the centralizer elements 21, where such obstructions could run the risk of leaving pockets that are empty of insulating material, and thus of continuity cold points that would degrade the performance of the insulating system. The flexible hose 11 is consequently of suitable length so as to accommodate the angular movement while still transferring granules 5a under gravity.

In a preferred version of the invention as shown in FIGS. 3A and 4A, 4B, 5C, the pipe is also regularly subjected to vibration by means of a vibrator, e.g. a servo-controlled hydraulic jack 8 secured firstly to the support $6_1$, $6_3$, and secondly to a table top 9, guided at $9_1$ relative to said support $6_1$, $6_3$, said table top also supporting said rollers 7. This device can thus not only cause the string to rock back and forth through an angle β, but can also cause the string to vibrate up and down, thereby improving the compacting of the insulating material while also avoiding zones that are empty of insulating material that would be harmful to the performance of the insulating system.

The weight of strings 1 having a length of 24 m or 48 m is very great, lying in the range 10 (metric) tonnes to 15 tonnes, so the power required for establishing vibration is advantageously reduced to a very small value by choosing the excitation frequency to be close to the resonant frequency of said string. For this purpose, a sequence is performed as shown in FIGS. 4A, 4B, and 4C.

Figure 4A:
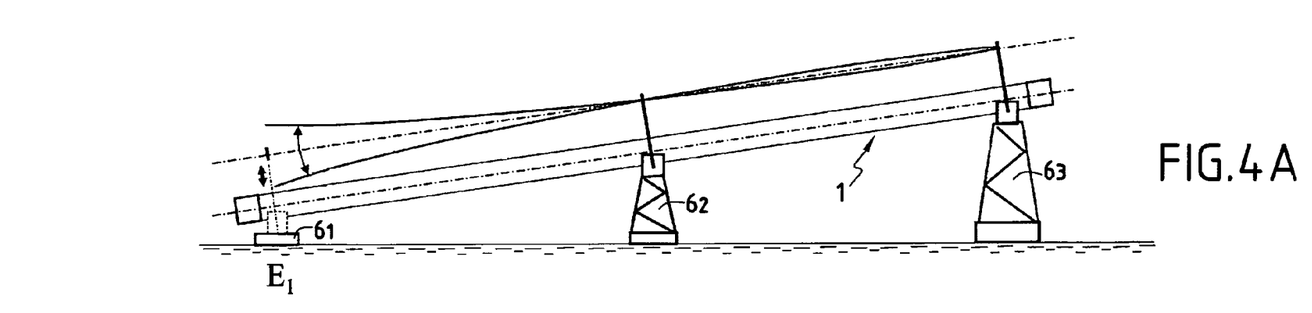
FIGS. 4A, 4B, and 4C are side views showing the method of compacting granules within the string by exciting the resonant frequency of vibration of the string, respectively in the bottom portion of the string (FIG. 4A), in the central portion (FIG. 4B), and in the top portion of the string (FIG. 4C)

At the beginning of filling, as shown in FIG. 4A, excitation is performed at the support $6_1$, the string being securely held at $6_2$ and at $6_3$ so that the vibrating cord constituted by the string presents nodes at its points of contact with $6_2$ and $6_3$. The excitation is performed at the resonant frequency T1 for this configuration. This leads to a large amount of movement that can be as great as several centimeters or even decimeters, while delivering very little power E1.

Figure 4B:
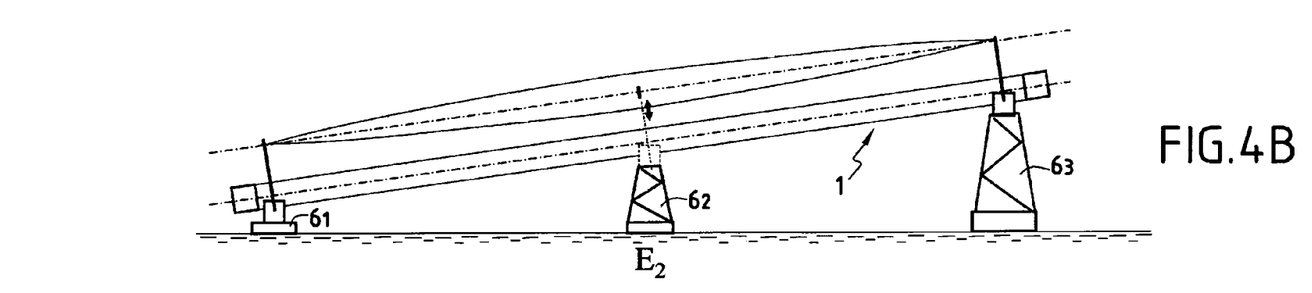

Once the rising front 5c of granules reaches the bottom third of the length of the string, the configuration of FIG. 4B is adopted in which the string is excited E2 at $6_2$ at the resonant frequency T2 while the string is held firmly at its points of contact with $6_1$ and $6_3$ so as to form nodes at those points for the vibrating cord.

Figure 4C:
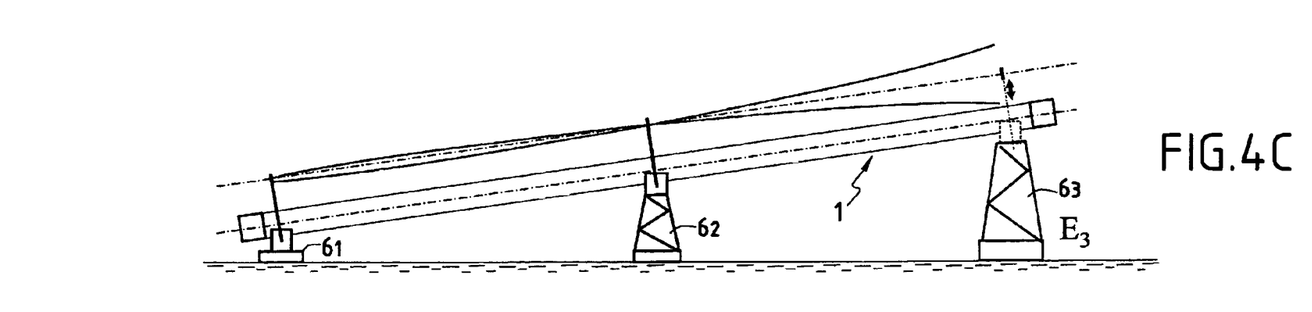

When the rising front 5c of granules reaches the top third of the length of the string, then the configuration of FIG. 4C is adopted in which the string is excited E3 at its point of contact with the top of $6_3$ at the resonant frequency T3 while holding said string firmly at its points of contact with $6_1$ and $6_2$ so as to form nodes at those points in the vibrating cord.

In a preferred version of the invention as shown in FIG. 3, during filling, the granules have incorporated therewith, either continuously or discontinuously, particles of getter material 17, either in the form of a powder or preferably in the form of granules. For this purpose, the installation has a second reservoir 18 provided with a filler hopper 181, an evacuating orifice 18a, an air-tight isolation valve 18b, and a second flexible hose 19 connecting with the filler chamber 14. The second reservoir 18 is maintained under a high vacuum throughout the entire duration of filling with the granules of insulating material and the getter material is then transferred merely under gravity in continuous or discontinuous manner, by opening the valve 18b. Said getter material is then distributed all along the string and can serve throughout the lifetime of the pipe installed on the sea bed to maintain the level of the vacuum at an optimum value, by absorbing or adsorbing the gas that results from degassing over time from the particles of insulating material, or from the steel walls of said annular space and from the end junction forgings.

Advantageously, said jacks, or mechanical actuators, are servo-controlled using a computer so as to cause said pipe element to vibrate at the resonant frequency of said pipe element. The use of computer controls enable control to be performed very precisely, not only over the stroke of said jack, but also over its exact trajectory over time, and to analyze in real time the response of the vibrating cord. Thus, as soon as the resonant frequency of the pipe is identified by the displacement sensors connected to the computer, the computer latches automatically onto said frequency and can then limit the amplitude of vibration by operating in known manner to control the rate at which energy is transferred to the vibrating cord constituted by the pipe.

By way of example, a PiP string having a length of 24 m and constituted by an inner pipe 2 with a diameter of 323.9 mm and a wall thickness of 21.4 mm, and an outer pipe 3 having a diameter of 406.4 mm and a wall thickness of 17.5 mm, has an annular space 4 representing a total volume of about 630 liters (L) with a radial extent of substantially 24 mm. The resonant frequency T1 of the string corresponding to the excitation E1 shown in FIG. 4A is substantially 2.49 hertz (Hz). The resonant frequency T2 of the string corresponding to the excitation E2 shown in FIG. 4B is substantially 0.44 Hz. The resonant frequency T3 of the string corresponding to the excitation E3 shown in FIG. 4C is substantially identical to T1, i.e. substantially 2.49 Hz. The power needed by each of the mechanical actuators or jacks 8 is limited to a few hundred watts (W), or possibly a few kilowatts (kW).

At these frequencies, the power transferred to the system by the mechanical actuators or jacks is controlled so as to limit the amplitude of the vibratory oscillations to a few tens of centimeters thus making it possible to limit local stresses in the outer pipe to levels that are acceptable in terms of strength and accumulated fatigue.

The transfer of granules 4a of insulating material through the flexible hoses is advantageously made easier by integrating spiral springs inside said flexible hoses, which springs are set into rotation by respective motors, preferably electric motors, thereby advantageously improving the drive of granules and preventing plugs of material forming, thus making the transfer of material more regular, particularly when the string is caused to rock back and forth, as explained with reference to FIG. 3A.

Advantageously, the insulating material used comprises granules having a diameter 0.5 mm to 2 mm and constituted by a silica aerogel from the supplier Cabot-USA. The density of the compacted material is about 100 kilograms per cubic meter ($kg/m^3$).

In order to facilitate understanding the method of applying vibration at the resonant frequencies, FIGS. 2 and 4A to 4C show a string supported by three support towers $6_1$-$6_3$. In fact, depending on the length of the string, and the diameters and thicknesses of the inner and outer pipes, the number of support towers required and their spacing is advantageously defined so that the resonant frequency of each of the segments corresponds to an acceptable range of values, thereby establishing rocking movement for the rising front of insulating material that encourages said insulating material to be compacted with the annular space of the PiP. Thus, for strings having a length of 48 m, it is advantageous to envisage using four, five, six, or seven support towers, or even more, that are spaced apart in regular or other manner, depending on the characteristics of the inner and outer pipes.

Compacting is advantageously improved by associating the setting into vibration of the pipe at its resonant frequency with a secondary vibration at a higher frequency, e.g. several hundreds or even thousands of hertz. This vibration is advantageously produced by local coupling in the zone of the rising front between an actuator, e.g. a motor connected to a rotating eccentric mass (not shown) to the outside or the inside of the pipe, respectively via the outer or inside wall of the PiP. The transferred power then serves not only to set the wall of the pipe into vibration, but also the particles of insulating material in said rising front zone, thereby improving the positioning and thus the overall compactness of the insulating material.

Figure 5:
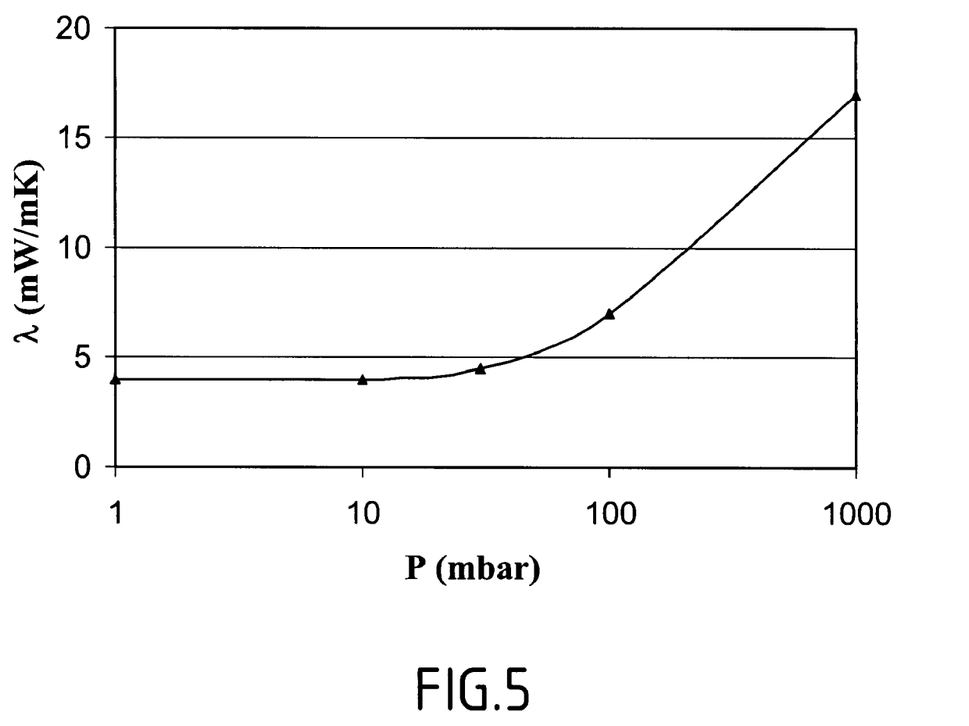
FIG. 5 is a graph relating to aerogels and plotting the value of the thermal conductivity λ (in milliwatts per millikelvin (mW/mK)) as a function of the absolute gas pressure (100 Pa=1 mbar).

Although aerogels present a level of performance that is advantageous at absolute pressures of about 10,000 Pa, i.e.

pressures of the order of one-tenth of atmospheric pressure, it is nevertheless advantageous to envisage much lower pressure levels, so as to operate in a quasi-horizontal portion of the curve plotting thermal conductivity as a function of absolute pressure, as shown in FIG. 5. With reference to the graph of FIG. 5, at a pressure of 500 Pa, i.e. 5 millibars, if the internal pressure increases, e.g. by 100%, perhaps because of degassing over time from the walls of the pipes, thermal conductivity $\lambda$ with remain constant at a value $\lambda$=4 mW/mK. In contrast, around 10,000 Pa, the thermal conductivity is about $\lambda$=7 mW/mK, and thus still very good, but it degrades very quickly in the event of pressure increasing, even by only a little.

The invention claimed is:

1. A method of thermally insulating the annular space in an element of an assembly of two coaxial pipes, in which a spacing is provided, the insulation being provided by a porous, thermally-insulating material that is confined under small absolute gas pressure, the method being characterized by:
   a) placing said element at an inclination, said annular space being closed at each end by a closure piece, the closure piece at the top end including a filler orifice that is closable; and
   b) substantially completely filling the annular space with said insulating material in the form of particles in bulk, by pouring the material into said filler orifice of the closure piece at the higher end of said inclined pipe element, said annular space being maintained under a high vacuum throughout filling.

2. A method according to claim 1, wherein the particles of insulating material present varying dimensions lying in a range 10 μm to 5 mm, so that the particles of the smallest dimensions can occupy interstitial spaces between particles of larger dimensions.

3. A method according to claim 2, wherein the particles of insulating material are spherical or substantially spherical grains.

4. A method according to claim 2, wherein said insulating material is a microporous or nanoporous material.

5. A method according to claim 1, wherein said pipe element is for use in assembling undersea steel pipes and presents a length lying in the range 10 m to 100 m, and each of said closure pieces is constituted by a circularly symmetrical junction forging for joining two of said coaxial pipe elements (1) together end-to-end, and serving to close said annular space at each end of said pipe element, said junction piece situated at the top end of said inclined pipe elements presenting a closable orifice in its outside wall, enabling said annular space to be filled with said insulating material.

6. A method according to claim 5, wherein said pipe elements includes at each of its a respective circularly symmetrical forging defined as follows:
   in a radial direction relative to a longitudinal axis XX' of symmetry of said forging, it is defined by a cylindrical inside wall having substantially the same diameter as the main portion of said inner pipe, and by a cylindrical outside having a diameter substantially equal to the outside diameter of the main portion of said outer pipe; and
   in the direction of the longitudinal axis XX':
      at the end of said junction forging for being by welding to the ends of said outer and inner pipes of a said element of an assembly of at least two coaxial pipes, said outer and inside walls of said junction forging forming in longitudinal section respective outer and inner first branches of substantially the same thickness as said outer and inner pipes to which they are to be assembled, said outer and inner first branches defining a first annular cavity; and
      at the opposite end of said junction forging for assembly to another said junction forging, itself assembled by being welded to the end of another element of an assembly of two coaxial pipes, said outer and inside walls forming in longitudinal section respective outer and inner second branches defining a second annular cavity; and
      the bottoms of said first and second cavities being spaced apart in said longitudinal direction XX' in such a manner as to define a solid zone of said junction forging in which said outer and inside walls form the outer and inner faces of a single cylindrical wall.

7. A method according to claim 1, wherein said particles of insulating material are shaken at least intermittently while the annular space is being filled by causing said pipe element to vibrate, and/or by causing it to pivot in angular rocking about its longitudinal axis XX' in order to compact said insulating material.

8. A method according to claim 1, wherein said pipe element is held in an inclined position by at least one support tower on which it rests, and it is preferably supported by at least three support towers, one support tower being disposed respectively at each of its ends and the other towers being distributed, in substantially regular manner, between said two end support towers.

9. A method according to claim 8, wherein said vibration is implemented as vertical up and down movements over an amplitude of 1 cm to 50 cm in height, said movements being imparted to said pipe element by means of one or more jacks disposed at the top(s) of said support tower(s).

10. A method according to claim 7, wherein the following steps are performed:
    at the beginning of filling, said pipe element is made to vibrate at its point bearing on the lowest support tower, and it is held firmly stationary at its bearing points on the tops of the other support towers; and
    when said filling has reached about one-third of the length of said pipe element, said pipe element is caused to vibrate at the top of a support tower situated substantially in the middle of its length, and said pipe element is maintained stationary on the support towers at each end; and then
    when filling has reached about two-thirds of the length of the pipe element, said pipe element is caused to vibrate at its bearing point on the support tower towards the top end of the inclined pipe element, and said pipe element is held firmly to the other two support towers.

11. A method according to claim 9, wherein said jacks are servo-controlled by a computer, so as to cause said pipe element to vibrate at the resonant frequency of said pipe element.

12. A method according to claim 9, wherein said jack actuates a platform supporting said wheels on which said pipe element rests, and vibration and angular pivoting is implemented back and forth, either sequentially or simultaneously.

13. An installation for use in implementing a method according to claim 1, the installation comprising:
    means for inclining a said pipe element,
    means for compacting by vibration and/or rocking during filling, preferably vibrator means using jacks and rotary drive means using wheels; and
    filler means comprising:
       a said first reservoir and a said first flexible hose; and
       vacuum pumps co-operating with said orifices that are provided with leaktight isolation valves.

14. A coaxial pipe element that is thermally insulated with a particulate porous insulating material that is filled into the inside of the annular space under a vacuum, at a pressure of less than 10,000 Pa, as can be obtained by a method according to claim 1.

15. A coaxial pipe element according to claim 14, wherein said particles present dimensions lying in the range 10 μm to 5 mm, and the filling coefficient of the annular space is greater than 85%.

16. A coaxial pipe element according to claim 14 comprising a circularly symmetrical junction piece at each of its ends for joining two pipe elements fitted therewith together, end-to-end.

17. A pipe element according to claim 14, wherein the insulating material is a microporous or nanoporous material, in the form of grains having a diameter of 0.5 mm to 5 mm.

18. A pipe comprising pipe elements according to claim 14, assembled end-to-end.

19. A pipe according to claim 18, the pipe being an undersea pipe made of steel.

20. A pipe according to claim 19, the pipe being a bottom-to-surface connection pipe suitable for providing a connection in great depth, preferably greater than 1000 m.

21. A method of thermally insulating the annular space in an element of an assembly of two coaxial pipes, in which a spacing is provided, the insulation being provided by a porous, thermally-insulating material that is confined under small absolute gas pressure, the method being characterized by:
  a) placing said element at an inclination, said annular space being closed at each end by a closure piece, the closure piece at the top end including a filler orifice that is closable; and
  b) substantially completely filling the annular space with said insulating material in the form of particles in bulk, by pouring the material into said filler orifice of the closure piece at the higher end of said inclined pipe elements, said annular space being maintained under a high vacuum throughout filling;
  wherein in step b) said insulating material is poured from a first reservoir in which a high vacuum is established by evacuating through an orifice of said reservoir that is provided with a first leaktight isolation valve, and said particles of insulating material are conveyed via a first flexible hose between said first reservoir and said filler orifice of a closure piece for closing the annular space at the top end of the inclined pipe elements, and before said annular space is filled and while said annular space is being filled, said annular space is itself evacuated via an orifice provided with a second leaktight isolation valve communicating with said first flexible hose.

22. A method according to claim 21, wherein said first flexible hose is connected to a filler chamber, the filler chamber being secured to said closure piece at said filler orifice, said filler chamber presenting an upwardly-flared funnel shape at its base, with the filler chamber being evacuated, said filler chamber further containing a handling device for handling a stopper enabling said filler orifice to be closed after filling.

23. A method according to claim 21, wherein said first reservoir communicates at its base with a separator chamber fitted in its top portion with a deflector in the form of a downwardly-flared upside-down funnel, for separating the particles of said insulating material from one another, said particles traveling merely under gravity towards a bottom orifice in the form of an upwardly-flared funnel in communication with said flexible hose, said separator chamber including an orifice provided with a second leaktight valve serving to evacuate said separator chamber, said first flexible hose, where appropriate said filler chamber, and also said annular space of said pipe element, which are connected thereto.

24. A method according to claim 23, wherein the following successive steps are performed:
  1) evacuating to a high vacuum, less than 10,000 Pa:
    both said first reservoir via said orifice provided with a first leaktight isolation valve; and
    the inside volumes of said separator chamber, of said first flexible hose, of said filler chamber, and of said annular space through said orifice of said first reservoir; then
  2) opening a bottom orifice provided with a third isolation valve interposed between said first reservoir and said separator chamber in such a manner as to put the inside of said first reservoir into communication with said separator chamber when they are at substantially the same high level of vacuum; and then
  3) closing said filler orifice from the inside of said filler chamber once said annular space is full of insulating material.

25. A method according to claim 22, wherein particles of getter material are mixed in with the particles of said insulating material via a second reservoir filled with particles of getter material and fitted with an orifice having a fourth leaktight isolation valve for evacuation purposes, said second reservoir co-operating via a fifth leaktight isolation valve in its bottom portion with a second flexible hose providing a connection with said filler chamber, said second reservoir being maintained at the same high level of vacuum throughout the filling operation, filling taking place merely under gravity by opening said fifth leaktight isolation valve.

26. A method according to claim 25, wherein said getter material is mixed continuously or discontinuously merely by opening said fifth leaktight isolating valve, thereby spreading getter material all along the length of said annular space of said pipe element.

27. A method according to claim 21, wherein said first flexible hose includes an internal spiral spring suitable for being set into rotation in order to improve the drive of particles and prevent plugs of insulating material forming inside said hose.

28. A method of thermally insulating the annular space in an element of an assembly of two coaxial pipes, in which spacing is preferably provided by centralizer elements, the insulation being provided by a porous, thermally-insulating material that is confined under small absolute gas pressure, the method being characterized by:
  a) placing said element of an assembly of two coaxial pipes at an inclination said annular space being closed at each end by a closure piece, the closure piece at the top end including a filler orifice that is closable; and
  b) substantially completely filling the annular space with said insulating material in the form of particles in bulk, by pouring the material into said filler orifice of the closure piece at the higher end of said inclined pipe elements, said annular space being maintained under a high vacuum throughout filling;
  wherein said particles of insulating material are shaken at least intermittently while the annular space is being filled by causing said pipe element to vibrate, and/or by causing it to pivot in angular rocking about its longitudinal axis XX' in order to compact said insulating material; and
  wherein pivoting is performed in back-and-forth angular rocking through an amplitude 2β, corresponding to turning through an angle of ±β of 5° to 45° relative to the vertical axial plane of the pipe element.

29. A method according to claim 28, wherein said back-and-forth angular rocking is implemented by means of motor-driven wheels disposed transversely to the longitudinal direction XX' of said pipe element and bearing against the outside wall of said pipe element, on either side thereof, and on which said pipe element rests, said wheels being disposed at the top(s) of said support tower(s).

\* \* \* \* \*